United States Patent [19]

Ho

[11] 3,784,976

[45] Jan. 8, 1974

[54] MONOLITHIC ARRAY ERROR DETECTION SYSTEM

[75] Inventor: Irving T. Ho, Poughkeepsie, N.Y.

[73] Assignee: International Business Machines Corporation, Armonk, N.Y.

[22] Filed: Apr. 10, 1972

[21] Appl. No.: 242,667

Related U.S. Application Data

[63] Continuation of Ser. No. 101,680, Dec. 28, 1970, abandoned.

[52] U.S. Cl. .................................... 340/146.1 AG

[51] Int. Cl. ........................................ G06f 11/10

[58] Field of Search ............... 340/146.1, 146.1 AB, 340/146.1 AG; 235/153 A, 153 AM

[56] References Cited

UNITED STATES PATENTS

| | | | |
|---|---|---|---|
| 2,958,072 | 10/1960 | Batley | 235/153 A |
| 3,270,318 | 8/1966 | Strawgridge | 235/153 AM |
| 3,428,945 | 2/1969 | Toy | 340/146.1 AB |
| 3,541,507 | 11/1970 | Duke | 340/146.1 AB |
| 3,693,152 | 9/1972 | Hong | 235/153 A |

*Primary Examiner*—Charles E. Atkinson
*Attorney*—Kenneth R. Stevens et al.

[57] ABSTRACT

An error detection system of n inputs is adaptable for fabrication in large scale integrated circuit form. An integrated circuit logic array provides a parity check in response to digital signals received via X and Y decoders. Reduction in the number of array cells and the X and Y driving decoder circuits is obtained by interconnecting even parity subgroups and odd parity subgroups of lines from the X and Y decoders to provide even master parity lines and odd master parity lines. A logic array having less than $2^n$ operative cells compares the signals on the master lines and generates an error parity signal. The improvement described herein specifically separates the decoder driver circuits into independent subgroups, each having their own array comparators for handling a large number of inputs.

5 Claims, 6 Drawing Figures

MONOLITHIC ARRAY ERROR DETECTION SYSTEM

RELATED APPLICATION

U.S. application Ser. No. 242,318, R. A. Henle et al., entitled "Monolithic Array Error Detection System," filed on the same date as the present application discloses the basic invention.

This is a continuation in part of U.S. application Ser. No. 101,680, filed Dec. 28, 1970, now abandoned.

SUMMARY OF THE INVENTION

In the past, error detection or parity checking has been performed either with logic circuitry or with a read-only memory logic array.

Typically, identical exclusive OR blocks, such as the ones illustrated in the prior art circuits of FIG. 1, are interconnected to provide an exclusive OR tree for parity checking. Both these separate exclusive OR blocks comprise conventional current switch and emitter follower elements. When implemented, the upper block includes dotted AND clamps at both in-phase and outphase collectors of current switch transistors (not shown). The lower block also comprises current switch and emitter follower elements; however, in this circuit dotted collectors (not shown) are provided only on the in-phase output only. When performing parity checking with logic circuits of this type, obvious disadvantages result. Firstly, as the number of inputs are increased, a greater number of exclusive OR blocks are required. To perform a parity check on n inputs, $(n-1)$ exclusive OR blocks are necessary for the circuits illustrated in FIG. 1. This increases not only propagation delay, but also requires increased chip area and power dissipation when implemented in monolithic form.

The problem of propagation delay accompanying parity checking logic circuits is somewhat diminished by employing a prior art logic array, illustrated in FIG. 2. In this type of arrangement, the first order of propagation delay is virtually constant regardless of the number of inputs, n, to the error detection circuitry. However, to check the parity of n bit inputs with array logic, it is necessary to employ $2^n$ cells comprising $2^{n/2}$ rows and columns, respectively, when n is even; and with $2^{(n+1)/2}$ columns and $2^{(n-1)/2}$ rows, or vice versa, when n is odd.

The present invention employs the array logic approach in providing an error detection or parity checking system which is advantageously implemented in large scale integrated monolithic circuit form. When compared with the logic circuitry approach, the present invention possesses increased figures of merit over the prior art logic circuits, FIG. 1, as to power dissipation, chip area, and circuit time delay. And, the present invention significantly reduces the number of necessary decoder circuits as a number of the inputs, n, are increased.

Moreover, the present invention provides reduced power consumption requirements in contrast to prior art array error detection arrangements in that the number of cells is theoretically reduced to a 2 × 2 matrix, having only two operative cells, regardless of the number of inputs, n, to the system, as opposed to $2^n/2$ operative cells for n inputs in the prior art array technique. More importantly, the present invention significantly reduces the number of decoder driver circuits over the number of decoder circuits which would be required in the prior art array approach in order to handle the same number of n input signals. Also, fan-out limitations from decoder driver circuits are readily eliminated, because the input signals, n, are conveniently separable for interconnection to independent groups of decoder driver circuits.

The present invention realizes that it is unnecessary to identify exactly which of the inputs to the system is the cause of a parity error. In prior art parity checking systems such an identification allowed precise troubleshooting prognosis. However, in large scale integration such precise identification is of little value or impossible to achieve, because the testing procedures are limited, contrasted to discrete type circuit testing, and further, exact remedial repairs are constrained due to the size of the integrated circuits. The present invention takes advantage of this fact and provides an error detection system which instead identifies a parity error, without concern as to the particular location of the error in the input signal.

Therefore it is an object of the present invention to provide an improved error detecting or parity checking array system having superior figures of merit with respect to power dissipation, semiconductor chip area, and circuit time delay.

Another object of the present invention is to provide an improved array logic parity checking or error detection system which significantly reduces the number of decoder driver circuits over known array logic error detection systems, particularly as the number of inputs to the system are increased.

The present invention provides an improved array error detection or parity checking system by interconnecting all the output lines from the X decoder representative of an even parity, interconnecting all the X decoder lines representative of an odd parity, interconnecting all the Y decoder lines representative of an even parity, and interconnecting all the Y decoder lines representative of an odd parity so as to provide an X direction pair of master parity lines, and a Y direction pair of master parity lines. These master lines are then compared in a 2 × 2 semiconductor array in order to generate an error output signal. The present claimed invention as illustrated in FIG. 4, is an improvement of the basic invention (U.S. Ser. No. 242,318), and particularly describes a system for handling large numbers of inputs, n, in which decoder driver circuits are selectively separated into independent subgroups. Each of the subgroup decoder output lines in both the X and Y direction are then selectively interconnected to form respective even and odd master parity lines. Appropriate even and odd master lines are then compared in an associated 2 × 2 array (requiring only two operative cells). Output sensing means is commonly connected to the plurality of 2 × 2 arrays for providing an error or parity check output signal.

The foregoing and other objects, features and advantages of the invention will be apparent from the following more particular description of the preferred embodiment of the invention as illustrated in the accompanying drawings.

BRIEF DESCRIPTION OF THE DRAWINGS

FIG. 3 - DESCRIPTION

Figure 3:
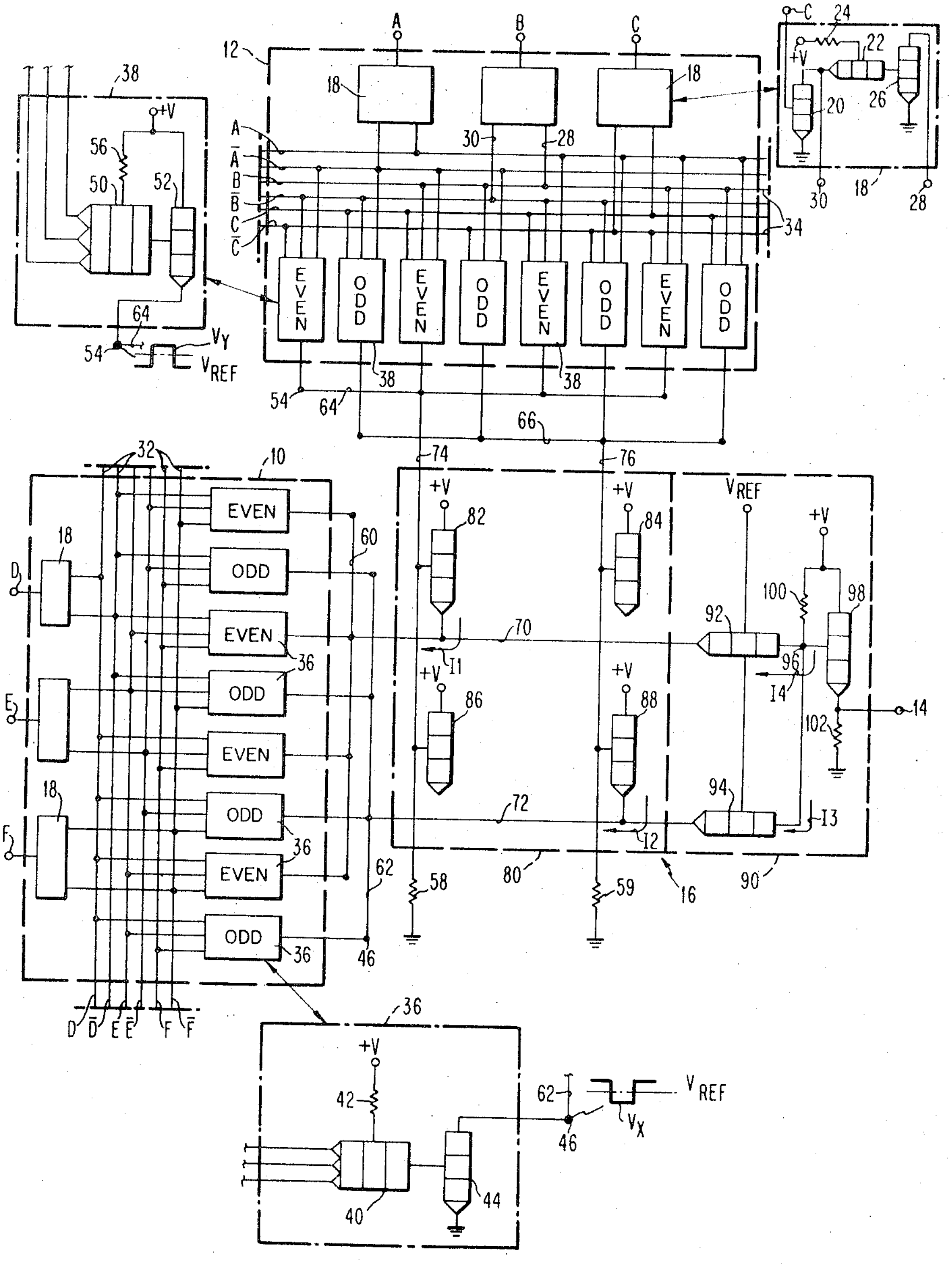
FIG. 3 is an electrical schematic diagram illustrating a more basic embodiment of the present invention. This basic embodiment is claimed in U. S. application Ser. No. 242,315, and is also described herein for purposes of completeness.

Now referring to FIG. 3, a parity checking or error detection system of the present invention is shown. The input signal or digital word comprises six bits of information designated as A . . . F. The input signal is selectively applied to an X decoder 10 and a Y decoder 12. As is well known in the error detection art, the digital input word includes data, as well as a parity or check bit. Arbitrarily, an error-free input digital word is either of an even or odd parity due to the insertion of an appropriate parity or check bit. As each digital word is processed through the error detection system, an output terminal 14 generates a signal to indicate that the digital word A . . . F is either even or odd parity. The X and Y decoders 10 and 12 are selectively interconnected at their output connections to an array matrix logic circuit 16.

The X and Y decoders each comprise a plurality of phase splitting or true complement circuit generators 18. A suitable implementation of a specific phase splitter circuit 18 is shown interconnected to the C input signal. This circuit 18 is constituted by a conventional $T^2L$ logic circuitry comprising an input switching transistor 20 adapted to receive an input signal at its base terminal, a reference transistor 22 connected via a biasing resistor 24 to a biasing voltage +V, and an output transistor 26. An in-phase output terminal 28 and an out-of-phase output terminal 30 are responsive to an input signal C, which is either in an up or down state, in order to provide an in-phase output signal or an out-of-phase output signal on lines 28 or 30, respectively. With the input signal in an up state or at a relatively positive voltage level, the input transistor 20 is in a conductive state and thus output terminal 30 is at a down level with respect to the voltage source +V. Under these conditions, the base to emitter terminal of output transistor 26 is not sufficiently forward biased and thus transistor 26 is non-conductive so as to place output terminal 28 at an up or relatively positive level. Conversely, with a down level input signal applied to the base of input transistor 20, the input transistor 20 is reverse biased at its base emitter junction and is in a non-conductive state. Accordingly, output terminal 30 is at an up level. Similarly, the base to emitter terminal of output transistor 26 is forward biased and thus it is conductive so as to place the output terminal 28 at a down level.

Both the X decoders 10 and the Y decoders 12 comprise a plurality of phase splitter circuits 18 in order to generate true and complementary signals for application to a plurality of X decoder lines designated at 32, and a plurality of Y decoder lines designated at 34.

The plurality of lines 32 are selectively interconnected to a plurality of X decoder driving circuits 36, and the plurality of Y lines 34 are selectively interconnected to a plurality of Y decoder driving circuits 38.

One of the circuits 36 is specifically illustrated and comprises conventional $T^2L$ logic circuitry. The circuit 36 includes a plurality of input terminals which are interconnected to a multi-emitter coupling transistor 40 via its emitter terminals. The coupling transistor 40 is connected at its base terminal by way of a biasing resistor 42 to a biasing voltage +V. An output transistor 44 is connected to the coupling transistor 40 via its base terminal and to an output terminal 46 by way of its collector terminal. The emitter of the output sensing transistor 44 is connected to a fixed potential, such as ground potential. The $T^2L$ decoder driving circuit 36 provides a conventional NAND type of function at its output terminal 46, as is well known in the art. For example, with any or all of the emitter terminals of coupling transistor 40 at a down level, the base to emitter terminal of output transistor 44 is non-conductive. Its collector terminal or output terminal 46 is thus at an up level. Conversely, when all the emitter terminals of coupling transistor 40 are in an up state, current flows between the base and emitter terminals of transistor 44 and thus transistor 44 is in a conductive state so as to generate a down level, $V_X$, on output terminal 46.

Thus, for any combination of input signals D, E and F, a down level, $V_X$, is generated by either one of the decoders 36 labelled EVEN or, in the alternative, by one of the decoders 36 labelled ODD.

The Y decoder driving circuits 38 are similar $T^2L$ type logic circuits, except the logic circuits 38 perform a positive AND logic function. The illustrated circuit 38 comprises a multi-emitter $T^2L$ coupling transistor 50 connected via respective emitter terminals to a plurality of input terminals. An output sensing transistor 52 is connected at its emitter terminal to an output terminal 54. Again, the base of the coupling transistor 50 is connected to a biasing voltage of +V via resistor 56. The collector of the output transistor 52 is connected to a source of voltage +V. Each of the output terminals from the even decoders 38 share a common biasing resistor illustrated at 58, which is in turn connected to a ground potential. Similarly, each of the odd decoder driver circuits 38 are connected at their output terminals to a fixed reference voltage, such as ground potential, by way of a biasing resistor 59. Schematically, the biasing resistors 58 and 59 are shown interconnected outside of the decoder driver circuits 38; however, it is understood that the resistor 58 or 59 is readily implemented into one of the specific decoders, if desired, and merely serves as a common load resistor for the particular mutually intercnnected driver circuits 38.

When all of the input terminals to the coupling transistor 50 are in an up state, the output transistor 52 is conductive, and thus the output terminal 54 is in an up state or at a relatively positive voltage level with respect to its associated load resistor, such as 58. Similarly, when all or any of the input signals to coupling transistor 50 are in a down level, the output transistor 52 is non-conductive and thus the output terminal 54 is in a down level or essentially at ground potential. Accordingly, in response to the application of any combination of even parity input signals A, B and C, one of the four decoders 38 labelled EVEN is responsive to generate a relative up level illustrated as $V_Y$. In the alternative, one of the four decoder driver circuits 38 labelled ODD is operative to generate an up level of $V_Y$ if the application of input signals A, B and C provide an odd number of parity bits.

All of the even parity decoder driver circuits 36 are interconnected at their output terminals by a common line 60. All the odd parity decoder output lines are interconnected by a common line 62. Similarly, all the even decoder driver circuits 38 are interconnected at their output connections to a common line 64, and all the odd decoder driver circuits 38 are interconnected at their output connections to a common line 66. In monolithic form the lines 60, 62, 64 and 66 can be conveniently formed by using wired-OR techniques.

The array matrix logic circuit 16 is connected to the X decoder arrangement via an even master parity line 70 and an odd master parity line 72. Likewise, the Y decoder driver circuit arrangement is connected in the coordinate direction by an even master parity line 74 and an odd master parity line 76.

The array matrix logic circuit 16 comprises a first logic section 80 in order to logically compare the signals received from the master parity lines. The section 80 comprises a plurality of coordinate cells comprising NPN transistors 82, 84, 86 and 88. Each of the collector terminals of the cell transistor is connected to a voltage +V. The base terminals of transistors 82 and 86 are connected to the master even parity line 74, and the base terminals of cell transistors 84 and 88 are connected to the master odd parity line 76. The emitter terminal of transistor 82 is connected to master line 70 and the emitter terminal of transistor 84 is unconnected. The emitter terminal of transistor 86 is left unconnected from the odd master parity line 72 while emitter terminal of transistor 88 is connected to line 72. The array 80 is readily implemented in monolithic form and contains a minimum number of elements, i.e., a 2 × 2 matrix. Since the two transistors 84 and 86 are not functionally operative, they may be entirely omitted in the monolithic implementation. However, they are schematically depicted because it is sometimes desirable to fabricate an array with cells located at every coordinate intersection for purposes of mask standardization. Selected transistor or cells are then rendered operative or inoperative during the metallization step of the fabrication process.

The sensing section of the overall circuit 16 is indicated at 90. The sensing circuit 90 operates in a current switch emitter follower mode and comprises a pair of reference transistors 92 and 94 connected at their base terminals to a source of reference potential $V_{REF}$. The emitter terminal of transistor 92 is connected to line 70, and the emitter terminal of transistor 94 is connected to line 72. The collectors of transistors 92 and 94 are commonly connected at node 96 to an output sensing transistor 98 which functions in an emitter follower mode. A voltage source of +V and a biasing resistor 100 are connected between the base and collector terminals of the output sensing transistor 98. The emitter terminal of output sensing transistor 98 is connected to the output terminal 14 and to a fixed reference potential, for example, ground potential by way of the resistor 102.

As is readily apparent from the logical interconnections of the X decoder circuits, the master even parity line 70 and the master odd parity line 72 are responsive to the application of input signals, D, E and F so as to provide the following logical function:

$$F\ (\text{line } 70) = \overline{(\bar{D}\bar{E}\bar{F}) + (\bar{D}EF) + (DE\bar{F}) + (D\bar{E}F)}$$

$$F\ (\text{line } 72) = \overline{(\bar{D}\bar{E}F) + (\bar{D}E\bar{F}) + (D\bar{E}\bar{F}) + (DEF)}$$

Likewise in the Y direction, the logical functions received by the master even and odd parity lines 74 and 76 are as follows:

$$F\ (\text{line } 74) = \bar{A}\bar{B}\bar{C} + \bar{A}BC + A\bar{B}C + AB\bar{C}$$

$$F\ (\text{line } 76) = \bar{A}\bar{B}C + \bar{A}B\bar{C} + A\bar{B}\bar{C} + ABC$$

OPERATION - FIG. 3

For purposes of explanation it is assumed that a check bit is added as one of the digital inputs A . . . F in order to insure that the digital word is of even parity. With the illustrated logical interconnections, the output terminal 14 is responsive to generate an up level whenever the combination of the applied input signals (A . . . F) provides an even parity. On the other hand, a down level is generated from the output terminal 14 whenever the combined input signal (A . . . F) is of odd parity, and in this example would indicate an error signal. The following chart illustrates that when the digital word A . . . F is separated in the X and Y directions the possible combinations of even and odd parity situations are:

| X (Line 70 or 72) | Y (Line 74 or 76) |
|---|---|
| Odd | Odd |
| Even | Even |
| Odd | Even |
| Even | Odd |

From the above chart it can be seen that the first two combinations give rise to an overall even parity, and the last two combinations give rise to overall odd parity. Thus, for the first situation, the output terminal is at an up level and is indicative of an even parity or correctly formed word, in the given example. In the latter group, a down level is generated at the output terminal 14 and is indicative of an error signal. For example, with the 70 at a down level and line 74 at an up level, transistor 82 is conductive so as to supply a current up I1 in the direction designated. At this time, line 72 is at a relatively positive level and thus the line 72 is blocked. In other words, transistor 88 is nonconductive and thus I2= 0, and similarly, reference transistor 94 is blocked and thus I3 = 0. Since the base potential on reference transistor 92, $V_{REF}$, is less positive than the up level signal $V_Y$, applied to the base of transistor 82, transistor 92 is non-conductive and thus I4 = 0. In this situation, the only current flowing is I1 provided by conduction of transistor 82. Consequently, node 96 is in an up level and thus output transistor 98 is conductive so as to place output terminal 14 at a relatively up level due to emitter follower action. An even parity output signal is thus generated.

On the other hand, assuming an error occurred in response to the application of signals D, E, F, one of the odd decoder driver circuits 36 is operative to generate a down level on line 72 instead of its being generated on line 70. Line 70 goes to an up condition and thus the line is completely blocked so as to make I1 = I4 = 0.

In this situation, line 76 is still at a down level and thus transistor 88 is non-conductive and therefore I2 = 0. The base potential of transistor 86 is relatively positive and normally transistor 86 would be conductive so as to supply current to the line 72. However, its emitter input terminal is left unconnected from the line 72 and therefore all the current must be supplied by way of the reference transistor 94. The flow of current I3 causes node 96 to be lowered so as to turn off output transistor 98. With transistor 98 in a non-conductive state, the output terminal 14 is at a down level. Again, the down level is representative of an odd parity or error signal in this example.

FIG. 4 - ERROR DETECTION SYSTEM

Figure 2:
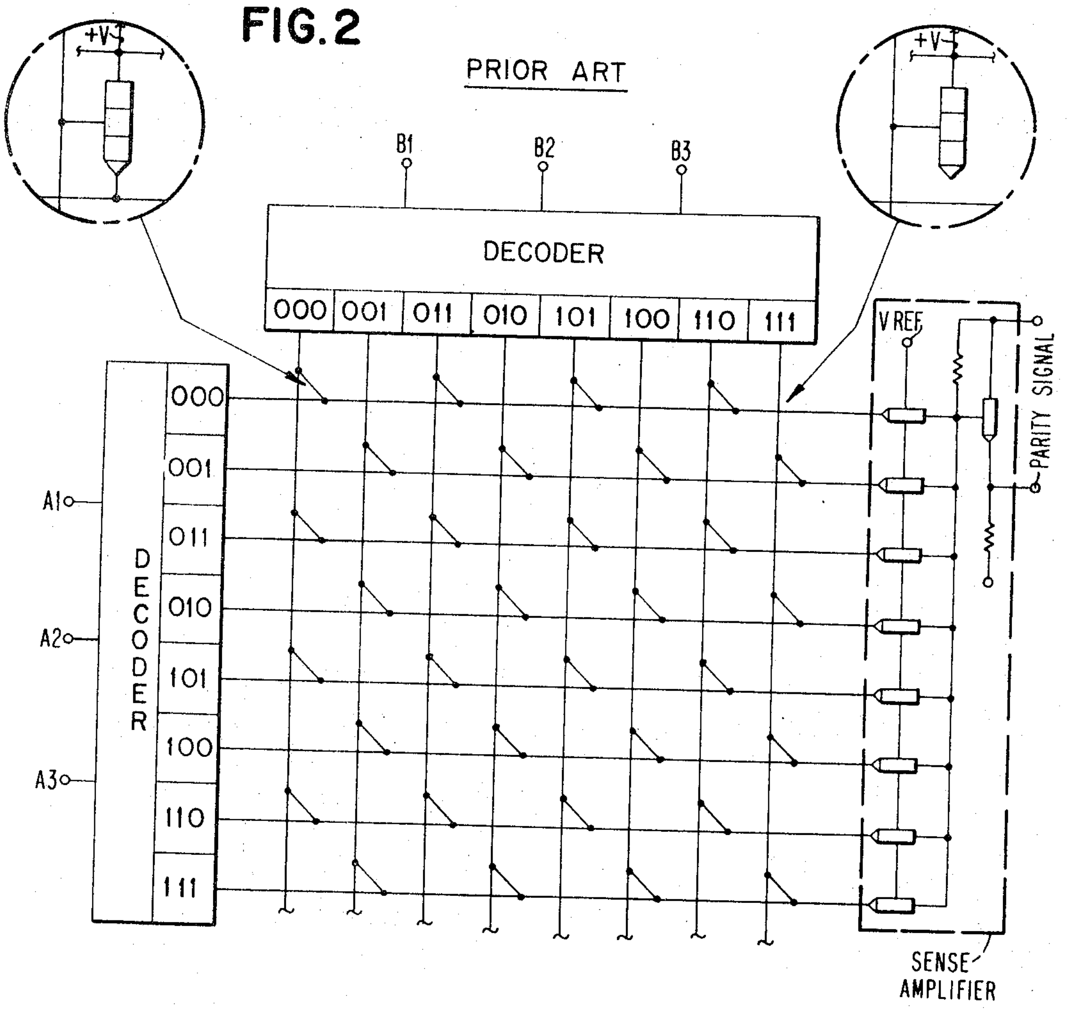
FIG. 2 is an electrical schematic of a prior art array logic parity checking or error detection system.
Figure 1:
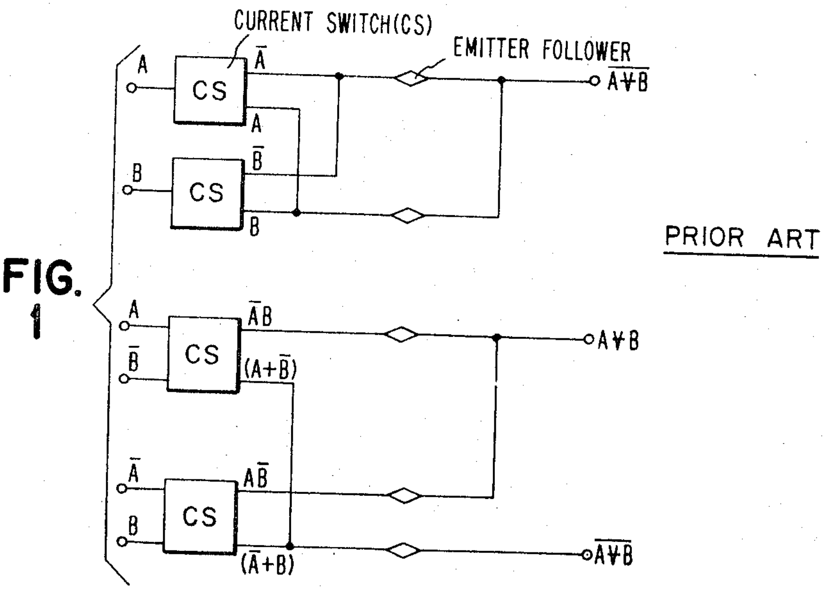
FIG. 1 schematically illustrates two prior art logic circuits employed for parity checking or error detection.

Using prior art array error detection systems, such as illustrated in FIG. 2, it is necessary to employ $2^{(n/2+1)}$ separate decoder driver circuits when the number of inputs, *n*., is even, and $3(2^{n/2 - 1/2})$ separate decoder driver circuits when *n* is odd. Clearly, for large numbers of inputs, *n*, the number of decoder driver circuits becomes totally impractical. For example, with n=16, a total of 512 separate decoder driver circuits are required in the combined X and Y direction.

Figure 4:
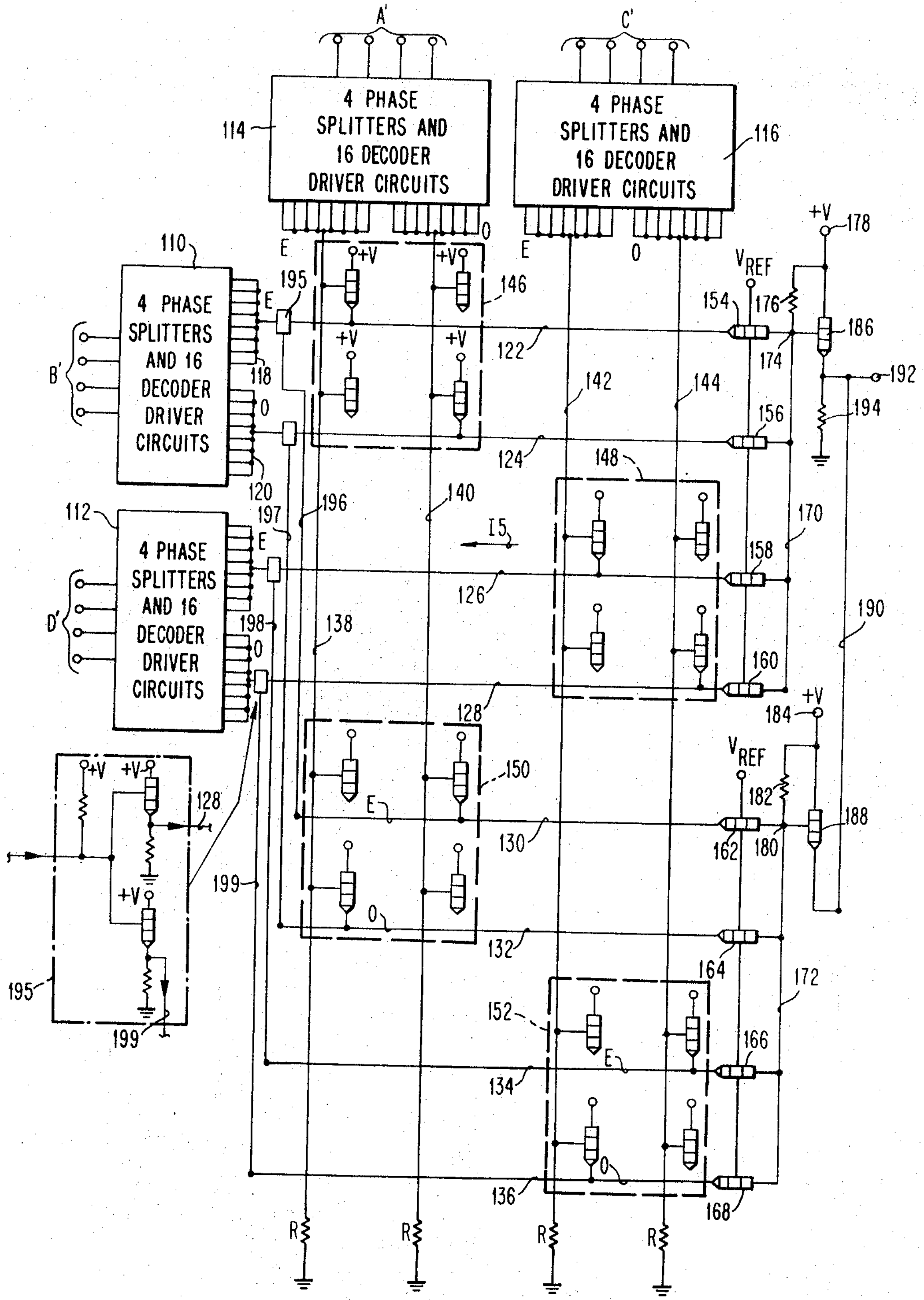
FIG. 4 and which forms the basis of the claimed subject matter of the present invention illustrates the separation of the X and Y decoders into independent subgroups, each connected to their own respective matrix array, in order to provide an array error detection or parity checking system requiring a minimum number of decoder driver circuits.

The present invention, as illustrated in FIG. 4, employs the basic principles of the arrangement described in FIG. 3, but in addition, greatly reduces the number of decoder driver circuits over known prior art array error detection arrangements. When implemented in monolithic form, a great saving in overall power dissipation and chip area is realized. For example, the error detection scheme of FIG. 4 is adapted to handle 16 different inputs, i.e., *n*=A' + B' + C' + D', with a total of $2^{(n/4 + 2)}$ decoders. This equation applies only to the cases where the number of inputs, *n*, is exactly divisible by 4, and, in this instance, is equal to 64 separate decoder driver circuits. Accordingly, the number of decoder driver circuits is substantially reduced from 512 separate decoder driver circuits to 64 separate decoder driver circuits. Of course, similar equations embodying this basic principle exist for the situations where *n* is exactly divisible by either 3 or 2.

From a structural standpoint, the error detection system of FIG. 4 is readily implemented in a manner almost identical to that previously described with reference to FIG. 3. The system receives a digital word containing 16 separate digital input signals in subgroups represented by A', B', C', D'. In the X direction, the signals B' and D' are applied via input terminals to their respective decoders 110 and 112. In the Y direction, the input signals A' and C' are received on input terminals which connect to a pair of decoders designated at 114 and 116, respectively. Each of the decoder driver circuits 110, 112, 114 and 116 comprise 4-phase splitter circuits and 16 decoder driver circuits. The phase splitter circuits in both the X and Y direction are implemented by the phase splitter circuits identical to those designated as elements 18 in FIG. 3. Similarly, each of the decoder driver circuits in the X direction are implemented by employing 16 separate decoder driver circuits identical to those disclosed in FIG. 3 as elements 36, and in the Y direction each of the 16 decoder driver circuits are identical to those designated as elements 38.

All of the output even terminals (E) from each of the eight even X decoder driver circuits, for example at decoder 110, are then interconnected by a common line 118, and the output odd parity lines (O) are connected by a common line 120. The common lines 118 and 120 are readily fabricated by wired-OR techniques. This selective interconnection is made for all the decoders in the error detection system. From these permanent output connections, pairs of master even and odd lines 122, 124, 126, 128, 130, 132, 134 and 136 are made in the X direction. Similarly, pairs of master even and odd lines 138, 140, 142 and 144, are made in the Y direction.

These coordinate master even and odd lines are compared by four groups of array logic designated at 146, 148, 150 and 152. Again, the arrays are implemented in an identical manner to that described in FIG. 3. Each of the master parity lines running in the X direction starting at the top, are connected to individual reference transistors 154, 156, 158, 160, 162, 164, 166 and 168. Each of the base terminals of the reference transistors is commonly connected to a source of voltage $V_{REF}$. The collector terminals of the upper four reference transistors are connected by a common line 170, and the collector terminals of the lower four transistors are similarly connected to a common line 172. A common node 174 is established on the upper common line 170 between a biasing resistor 176 and a source of voltage +V connected to terminal 178. Similarly, a common node 180 is established on the lower common line 172 and is connected to a biasing resistor 182 and to a voltage source +V at terminal 184. A pair of emitter follower output transistors 186 and 188 are interconnected to nodes 174 and 180, respectively. The emitter terminals of transistors 186 and 188 are commonly connected by line 190 to an output terminal 192. The transistors 186 and 188 share a common load resistor 194 which is, in turn, connected to a fixed reference potential, such as ground potential.

The output transistors 186 and 188 are responsive to the signals at nodes 174 and 180 to provide an OR function at output terminal 192. That is, with either node 174 or node 180 at an up level, output terminal 192 is also at an up level. Both nodes 174 and 180 must be at a down level in order for output terminal 192 to be at a down level.

The reference transistors connected to each of the X direction master lines operate in an identical manner to that described in connection with the reference transistors in FIG. 3. For example, with any of the upper reference transistors 154, 156, 158 or 160 in a conductive state, the output node 174 is in a down level due to current flow down through resistor 176 and through one of the lines 122, 124, 126, or 128 in the direction designated by I5. In order for node 174 to be in an up level, none of the reference transistors 154, 156, 158 or 160 can be conductive to pass current to their respective X lines. Operationally, the lower group of reference transistors 162, 164, 166 and 168 operate in an identical manner with respect to node 180. The resistors connected to the master even and odd Y direction lines designated R, function in a similar manner to the resistors indicated as 58 and 59 in FIG. 3.

Since the decoders 110 and 112 supply odd and even signals to a first pair of matrix arrays, 146 and 148, and to a second pair of matrix arrays 150 and 152, buffering is required between the first and second pairs of matrices. In order to perform the function, separate buffer circuits generally indicated at 195, are each interconnected between line 122 and a line 196 connecting to even master parity line 130; between the line 124 and a line 197 connecting to odd master parity line 132; between line 126 and a line 198 connecting to even master parity line 134; and between the line 128 and a line 199 connecting to odd master parity line 136.

Each of the buffer circuits 195 is well known as illustrated by the insert. For example, in response to a down level from any one of the X decoder driver circuits, both output lines 128 and 199 are down. Similarly, both output lines 128 and 199 are up when the input line is up.

As was explained in connection with FIG. 3, an even parity input signal in the Y direction causes an up level to be generated on the even parity master line (E) and a down level on its related odd parity master line (O). Alternatively, an even parity signal in the X direction causes a down level to be generated on the even master parity line (E) and an up level on its related odd master parity line (O). Likewise, the Y decoder driver circuits are responsive to generate an up level on the odd master parity lines in response to the portion on the overall input word to which they are connected, i.e., portion A′ or C′. The X direction decoder driver circuits generate a down level on their interconnected odd master parity lines in response to the application of an odd parity word portion, such as B′ or D′.

Operationally, the error detection system of FIG. 4 is logically interconnected to operate in an identical manner to that previously described with reference to FIG. 3. That is, output terminal 192 is adapted to generate an up level representative of an even parity in response to the application of an even parity in the input word A′, B′, C′ and D′. Conversely, when the input digital word contains an odd parity, a down level is generated at output terminal 192. Taking the example of:

| A′ | B′ | C′ | D′ |
|---|---|---|---|
| 0 | 1 | 0 | 1 |

the number of parity bits is even and an up level is generated on output terminal 192 in the following manner. Lines 130 and 134 are in an up level so as to block any flow of current through reference transistors 162 and 166. Lines 132 and 136 are at a down level or unblocked. However, lines 138 and 142 in the Y direction are in an up level so as to turn on the lower left hand transistors in matrix 150 and 152, respectively. Thus, in accordance with well known current switch principles of operation, the lower left transistors supply all the current flow to the lines 132 and 136. No current flow exists through either reference transistor 164 or 168. Accordingly, output node 180 is at an up level, as well as output terminal 192 so as to indicate an even parity for the combined input word A′, B′, C′, D′.

In a similar manner, with the total input word comprising an odd parity, for example:

| A′ | B′ | C′ | D′ |
|---|---|---|---|
| 1 | 1 | 0 | 1 |

a down level is generated at the output terminal 192.

Line 128 is in a down or in an unblocked state. No current is supplied by the lower right transistor in matrix 148 because its base terminal is connected to a down level via line 144. Thus, the current is supplied through transistor 160, and node 174 is at a down level. Similarly, line 132 is unblocked to allow current flow, but none is supplied by the lower left transistor of matrix 150 because its base is at a down level via line 138. Current flow is supplied through reference transistor 164 so as to bring node 180 to a down level. With both output nodes at a down level, the output terminal 192 is also at a down level to indicate an odd parity in the overall input word A′, B′, C′, D′.

FIG. 5 - MONOLITHIC IMPLEMENTATION

Figure 5:
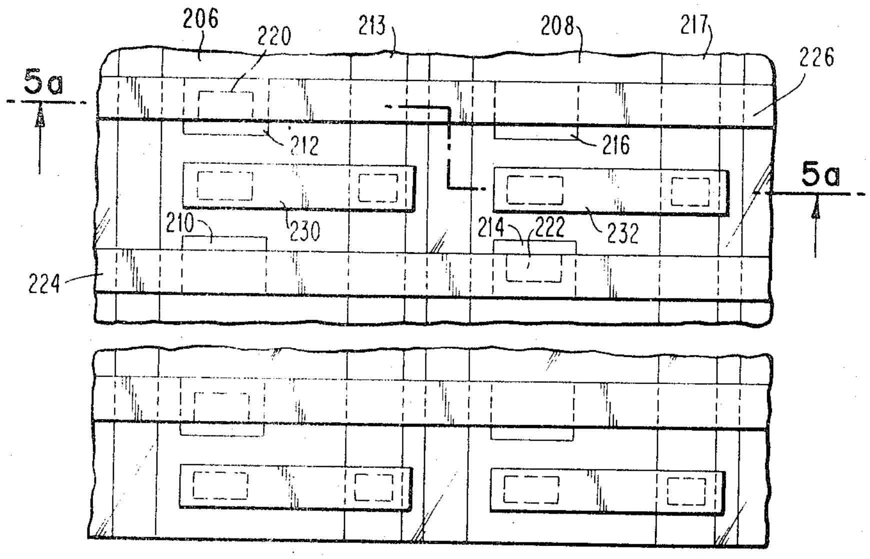
FIG. 5 is a partial plan view illustrating one manner of monolithically implementing the matrix array shown in FIG. 3, and FIG. *5a* is a partial cross section view of FIG. 5, taken along lines *5a—5a*.
Figure 5A:
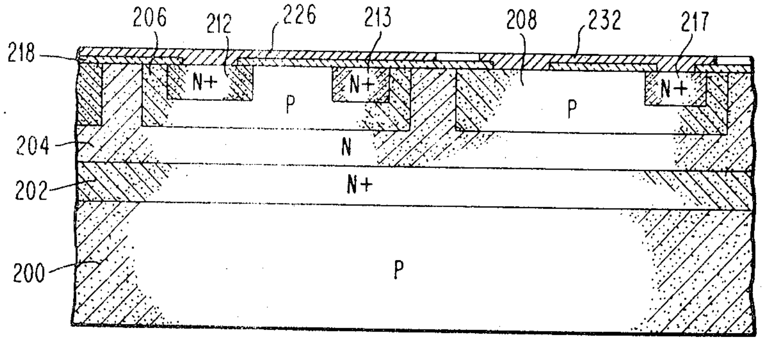

Now referring to FIGS. 5 and 5*a*, it illustrates a partial section of a monolithic implementation which can be employed to fabricate the matrix array, shown specifically in FIG. 3 as element 80, and in FIG. 4 as matrix arrays 146, 148, 150, 152. The entire error detection system may be fabricated on a single semiconductor P type substrate 200. The other elements such as the decoders and phase splitters comprise conventional $T^2L$ or current switch circuits and are readily implemented according to well known monolithic integrated circuit techniques. The monolithic implementation of the matrix arrangement is illustrated in order to show how certain monolithic fabrication difficulties are overcome and the manner in which certain advantages are realized by this preferred implementation.

Upon the P type substrate 200 there is formed an N+ diffusion region 202 which serves as a subcollector. Thereafter, an N type epitaxial region 204 is deposited over the region 202. Next, conventional diffusion techniques are employed to form P type base regions 206 and 208. The regions 206 and 208 constitute elongated base regions within which a plurality of transistors are formed by providing additional emitter regions for each of the NPN transistors desired. Four N+ diffused emitter regions 210, 212, 214 and 216 are specifically shown.

In order to provide Y line interconnections to the respective base regions 206 and 208, an N+ diffused strip 213 is formed in the base region 206, and an N+ diffused strip 217 is formed in the base region 208. Thereafter, a silicon dioxide layer 218 is formed over the upper surface of the device and appropriate openings are made using conventional mask etching techniques. Emitter contact openings 220 and 222 are formed over the emitter regions 212 and 214, respectively. Then, metallized lines 224 and 226 are deposited over the silicon dioxide layer 218 in order to make electrical contact to the emitter regions 212 and 214. No contact is made to the emitter regions 210 and 216, and these devices therefore correspond to the non-operative or non-function transistor in each of the 2 × 2 arrays. Hence, lines 224 and 226 constitute the monolithic version of the master even and odd parity lines in the X direction, and the diffused regions 213 and 217 comprise the master even and odd parity lines in the Y direction.

The N+ diffused regions 213 and 217 function to provide a low resistance contact to the base regions which is necessary for proper operation, however, the regions 213 and 217 form a PN junction or diode with their respective base regions. In order to electrically eliminate the diode associated with each of the separate cell transistors, metallized shorting lands 230 and 232 are deposited so as to connect N+ regions 213 and 217 directly to their respective base regions.

Although the invention has been particularly shown and described with reference to the preferred embodiments thereof, it will be understood by those skilled in the art that the foregoing and other changes in form and details may be made therein without departing from the spirit and scope of the invention.

What is claimed is:

1. An error detection array system adaptable for implementation in monolithic form comprising:

a. a plurality of m separate X and Y decoders, where $m$ is $\geqslant 3$, b. the X and Y decoders being responsive to a digital word having n bits of data, the n bits of data being separated into m groups, c. each of the plurality of X and Y decoders having input terminal means and a plurality of even and odd output terminal means, d. each of the X and Y decoders being independently responsive to a different one of the m groups of data to generate even parity signals and odd parity signals on their respective plurality of output terminal means, e. a logic matrix array having an ultimate parity output terminal means, the logic matrix comprising m number of subgroup matrices, each of said subgroups being connected to at least one of said even and odd output terminal means from said X decoders and also to at least one of said even and odd output terminals from said Y decoders, each of said subgroup matrices being also connected to said ultimate parity output terminal, and f. the logic matrix array being responsive to the even and odd parity signals for generating a parity output signal on said ultimate parity output terminal representative of either an even parity n bit digital word or an odd parity n bit digital word.

2. An error detection array system adaptable for implementation in monolithic form as in claim 1 wherein:

a. each of the separate X and Y decoders comprises a plurality of decoder logic circuits, and b. the total number of X and Y decoder logic circuits from even bits of data is less than $2^{(n/2+1)}$, and the total number of X and Y decoder logic circuits for n odd bits of data is less than $3(2^{n/2-1/2})$.

3. An error detection array system adaptable for implementation in monolithic form as in claim 2 wherein:

a. each of the m subgroups comprises less than $2^n/2$ functional cells.

4. An error detection array system adaptable for implementation in monolithic form as in claim 3 wherein:

a. each of the m plurality of X and Y decoders include a first means for interconnecting a plurality of the even output terminals together and a second means for interconnecting a plurality of the odd output terminals together.

5. An error detection array system adaptable for implementation in monolithic form as in claim 4 wherein:

a. each of the first and second means comprises a wired-OR interconnection.

* * * * *